United States Patent [19]

Johann et al.

[11] Patent Number: 5,109,450
[45] Date of Patent: Apr. 28, 1992

[54] POSITIONING OPTICAL WAVEGUIDES AND FIBER OPTIC ELEMENTS

[75] Inventors: Ulrich Johann, Markdorf; Heinz Sontag, Friedrichshafen, both of Fed. Rep. of Germany

[73] Assignee: Dornier GmbH, Fed. Rep. of Germany

[21] Appl. No.: 600,537

[22] Filed: Oct. 19, 1990

[30] Foreign Application Priority Data

Oct. 20, 1989 [DE] Fed. Rep. of Germany ....... 3934993

[51] Int. Cl.⁵ .............................................. G02B 6/36
[52] U.S. Cl. ..................................... 385/52; 385/147; 385/90
[58] Field of Search ................. 350/96.2, 96.21, 96.15; 385/15, 40, 23, 16, 52, 90, 147

[56] References Cited

U.S. PATENT DOCUMENTS

| 4,204,742 | 5/1980 | Johnson et al. | 350/96.2 |
| 4,938,552 | 7/1990 | Jehens et al. | 350/96.2 |
| 4,984,885 | 1/1991 | Ortiz, Jr. | 350/96.2 X |

Primary Examiner—John D. Lee
Assistant Examiner—John Ngo
Attorney, Agent, or Firm—R. H. Siegemund

[57] ABSTRACT

Optical waveguide ends are mechanically fixedly positioned so that an end portion projects from the clamp; electrode structure is disposed in relation to that projecting end for deflecting it in one or two directions basically perpendicular to the axis of the waveguide; and a high frequency oscillation is provided to the electrodes at an amplitude such that the inhomogenic field in the vicinity of the electrode structure moves that end portion, preferably at resonance frequency, to pass through maximum optical coupling with stationary optical input or output.

7 Claims, 1 Drawing Sheet

POSITIONING OPTICAL WAVEGUIDES AND FIBER OPTIC ELEMENTS

BACKGROUND OF THE INVENTION

The present invention relates to the positioning of fiber optic elemnts and waveguides with respect to a position in a precisely defined locality; any requirements in this regard usually being the more stringent the larger such an optical system is.

Usually mechanically operating piezoelectric, electromechanical or electromagnetical devices are used for adjusting the position particularly of the end windows of an optical wave guide and of light conductive elements (fiber optics) in general. All these methods have in common that the optical waveguide element and light conducting fiber is coupled mechanically to a moving mechanism. Therefore the mechanical properties of that mechanism determine the accuracy characteristics and so forth of adjustment. This principle holds true also for modulation devices as shown in German patent 28 39 444. A different field of art is concerned with electrical positioning by way of scanning of a fiber optic end vis-a-vis a relatively large plate (see e.g. U.S. Pat. No. 4,234,788). This patent has nothing to do with an accurate positioning, only with scanning of movement.

DESCRIPTION OF THE INVENTION

It is an object of the present invention to provide a new and improved positioning and coupling device for light conductive fiber particularly single mode optical waveguides which permits accurate dynamic position coupling, in the kHz range.

In accordance with the preferred embodiment of the present invention a fiber optical device using at least one optical waveguide or fiberoptic element is positioned by being held in a particular distance or spatial relation as to one of its windows on a free end of the element, by a mechanical holder, whereby this free end is arranged to cooperate with electrically energized electrodes, so that the particular window is movable through induced dipole interaction in an inhomogeneous electric field as it is effective at the electrodes; the amplitude of the motion is limited to an amount smaller than the diameter of the optically active fiber core and window.

In accordance with the invention therefore it is suggested to provide a deflection of a free optical wave guide end in an electrical field permitting motion of that freely suspended light conductor end in the micrometer range with a resolution that is in the subnanometer range. This way, particulary in the case of mechanical resonances, the fiber end's position will be modulated very efficiently with regard to the light input output coupling whereby it is very important that ultimately the device itself works without physically induced motion and consitutes electrically a very low capacitive load.

DESCRIPTION OF THE DRAWINGS

While the specification concludes with claims particulary pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a light coupling system for optical waveguides and light conductors such as an optical fiber element having an optically active core 2 in a protective sleeve or jacket 3. Primarily, and for purposes of facilitating the description of the invention, a somewhat simplified application of the device and arrangement is shown in FIG. 1. That device provides for a one dimensional deflection. The optical waveguide 2 is held and thereby fixed as far as its position in general is concerned in a mechanical holder 4 such that there is an end portion 6 that projects freely from that holder in a cantilever fashion such that the window 2a of optic 2 can vibrate in the plane of its extension.

Figure 1:
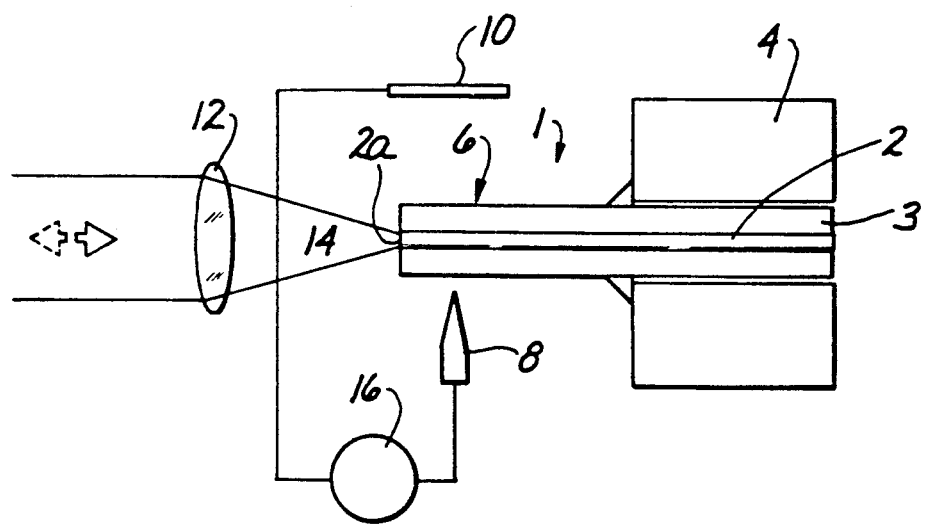
FIG. 1 shows a device in accordance with the preferred embodiment of the invention for a simplified version that encompasses a one dimensional positioning and deflection of a fiber optic end.

The end portion 6 of the waveguide is in fact situated between two electrodes 10 and 8 which are shown to be of substantially different configuration and positioning. The whole purpose of this is to provide a highly inhomogeneous electric field between the electrodes 8 and 10. Reference numeral 16 refers to a controlled source of power supply to which electrodes 8 and 10 are connected. As a consequence of the inhomogeneous electric fields a dipole interaction is set up with the waveguide, and a resulting force is produced such that the particular end 6 of the light optical waveguide and fiber optic is deflected and moved in the direction towards electrode 8.

Reference numeral 12 is a lens for focusing or collimating a light beam 14 whereby it is basically unimportant whelther or not this beam is an input beam (solid arrow) or an output beam (dotted arrow). In the present case an input beam is illustrated in solid lines but in terms of the invention the direction of the light depends on the circumstances and has nothing to do with basic aspects of the invention.

It can thus be seen that by deflecting the end 6 of the fiber optic core 2 and by deflecting its window 2a in a direction which is in the plane of the window and is in fact included in the plane of the drawing of FIG. 1 the optical relationship between the fiber optic element on one hand and the lens 14 and light beam on the other hand is modulated. The positioning of the window 2a vis-a-vis the lens 12 is thus a dynamic one with maximum/minimum light transmission representing maximum-minimum way of positioning. By way of electric control limiting for example the transmission and reception of signals to the instances of maximum transmission, data acquisition is indeed restricted to instances of optimum coupling between fiber optic 1 with core 2 and lens optic 12.

Proceeding now to the description of FIG. 2 there is again shown an optical input coupler system, but output coupling is of course again within the realm of possibility. Accordingly there is a beam 14 in either direction and a lens 12 optically cooperating with that beam.

There is again a fiber optic 1 with core 2 and a window 2a, all of an end portion 6. Now, the deflection produced by the end 6 results from a capacitive interaction between electrode 8' on one hand and an electrically conductive coating 18 on the fiber optic 2. Again, as a voltage is applied by the power source 16 between the electrode 8' and the layer or coating 18 a highly inhomogeneous field obtains which provides a force upon this end 6 of the fiber end deflecting it within the plane of the window 2a, again in the plane of the drawing.

Figure 3:
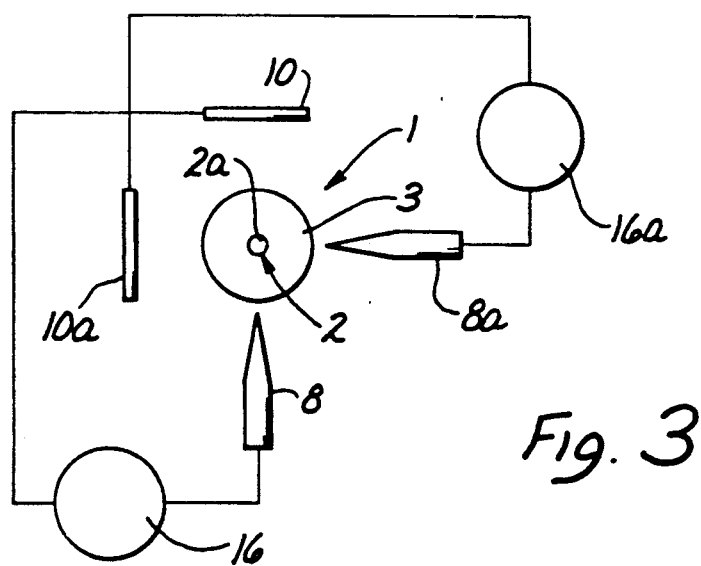
FIG. 3 illustrates the device in accordance with the preferred embodiment of the present invention for practicing the best mode thereof within a two dimensional deflection field.

FIG. 3 illustrates in fact a composite arrangement. It is assumed by way of example, and without intending to be restrictive, that a basic syatem as shown in FIG. 1 is used. There is, accordingly, a pair of electrodes 10 and 8. But the plane of drawing of FIG. 3 is at right angles to the plane of the drawing to FIG. 1 so that the window 2a in this case is shown in plane view. This way one can see that a second set of electrodes 10a and 8a connected with their own power source 16a provide for a deflection of that end 6 of the fiber optic, orthogonal to the one provided by electrodes 8 and 10, but still, the deflection is within the plane of the window 2a.

The electrode pairs can be arranged spatially in a staggered relation (physically or through control) such that if the fields produced by the two pairs have the same frequency but the oscillations have a fixed phase relationship one can induce for example a kind of circular motion or an elliptical motion depending on the relative amplitudes involved of that fiber optic end. The two dimesional deflection of the fiber optic 6 by means of the two sets of electrodes arranged at a 90 degree relationship as shown in FIG. 3 (or in cases be obtained in that) a single optic will be a cover with an asymmetric module of elasticity. Alternatively, there may be an asymmetric fastening provided for holding this fiber optic. In this case one obtains different mechanical resonances for the two directions of symmetry with which the fiber optic end 6 vibrates.

The electrodes in FIG. 3 do not have to have a 90 degrees angular displacement. Also the relation between a single electrode and an asymmetrical sheathing can be such so as to obtain various patterns of vibratory movement of the window 2a within its plane. Thus, in case the respective angle between electrodes and/or between them and the determinative axis of dielectric asymmetry is appropriately selected, then upon choosing a particular stimulating frequency even in the case of a single electrode with a one dimensional excitation, one obtains in fact a two dimensional motion, including for example a circular or elective motion of the fiber end and window 2a.

Figure 2:
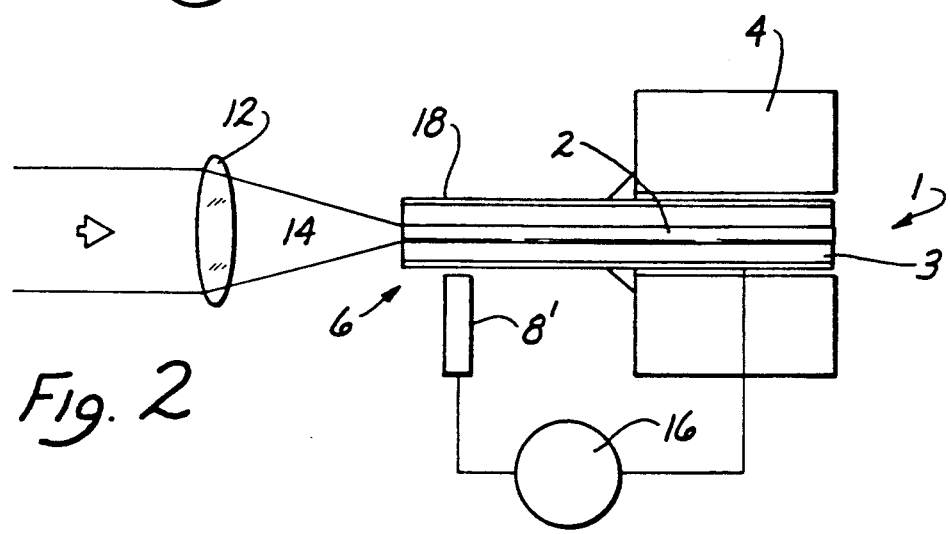
FIG. 2 shows a modification of the device shown in FIG. 1 and again with one dimensional positioning and deflection.

Under utilization of experimental structure shown in FIG. 2 it was found that on stimulating the fiber end in an electrical alternating field with a frequency that is attuned to the mechanical resonance frequency of the clamped fiber end 6 one obtains a modulation degree of the light that can interact between the fiber optic on one hand the optic lens 12 on the other hand, up to a modulation degree 90% and even more. For this a standardized single mode light fiber or fiber optic was used with an outer diameter not exceeding 125 micrometer and a core (2) diameter of about 5 micrometers for a wavelength of light of 800 nanometers. The length of the fiber end 6 that projects beyond the holder 4 in each case is typically 12 mm and in this particular example just mentioned an Eigenfrequency or resonance frequency of 500 cps obtains. The amplitude of the resulting deflection of the fiber end and window 2a was about 4 micrometer for an amplitude of applied voltage of about 12 volts.

It can readily be seen that the inventive structure is small, compact, will not weigh much and is still rather sturdy. The power input is very minimal and can in fact be used to move the ends of fiber optics in a plane in discontinuous or continuous fashion.

The invention is not limited to the embodiments described above but all changes and modifications thereof, not constituting departures from the spirit and scope of the invention, are intended to be included.

We claim:

1. Adjustable positioning device for an end of an optical waveguide or fiber optic element, comprising
    means for clamping and mechanically fixedly positioning at least a portion of the fiber optic element such that an end portion projects freely therefrom;
    electrode means disposed in relation to that projecting end for deflecting said end in at least one direction, basically perpendicular to an axis of said fiber optic element and optical waveguide; and
    means connected for providing a high frequency oscillation to said electrodes at an amplitude and in a position such that an inhomogenic electric field as set up in the vicinity of said electrode means and as being effective on said fiber optic elements, moves said fiber optic element end portion in said perpendicular direction by distance smaller than a diameter of a core of said fiber optical element itself.

2. Device as in claim 1 said electric field being provided by two electrodes spaced from said optical element and waveguide.

3. Device as in claim 1, said electrode means including two pair of electrodes arranged to provide deflection of said waveguide element and in two directions both being perpendicular to said axis.

4. Device as in claim 1, said electrode means including a first electrode being a coating on said fiber optical element and a second electrode spaced therefrom.

5. Device as in claim 1, said frequency being attuned to a resonance frequency of said projecting fiber element end.

6. Device as in claim 1, said fiber optic elements having an symmetrical module elasticity.

7. Device as in claim 1, said holding force provided by said holder being asymmetrical.

* * * * *